United States Patent
Nunzi et al.

(10) Patent No.: US 9,210,042 B2
(45) Date of Patent: Dec. 8, 2015

(54) METHOD AND SYSTEM FOR OPTIMIZING NETWORK PERFORMANCES

(75) Inventors: Giorgio Nunzi, Heidelberg (DE); Marcus Brunner, Leimen (DE)

(73) Assignee: NEC EUROPE LTD., Heidelberg (DE)

( * ) Notice: Subject to any disclaimer, the term of this patent is extended or adjusted under 35 U.S.C. 154(b) by 1023 days.

(21) Appl. No.: 12/677,914

(22) PCT Filed: Sep. 14, 2007

(86) PCT No.: PCT/EP2007/008018
§ 371 (c)(1),
(2), (4) Date: Mar. 12, 2010

(87) PCT Pub. No.: WO2009/033500
PCT Pub. Date: Mar. 19, 2009

(65) Prior Publication Data
US 2010/0309799 A1    Dec. 9, 2010

(51) Int. Cl.
*H04L 12/24* (2006.01)
*H04Q 3/00* (2006.01)

(52) U.S. Cl.
CPC .......... *H04L 41/0833* (2013.01); *H04L 41/044* (2013.01); *H04L 41/0869* (2013.01); *H04Q 3/0062* (2013.01)

(58) Field of Classification Search
None
See application file for complete search history.

(56) References Cited

U.S. PATENT DOCUMENTS

| 8,204,004 | B2 | 6/2012 | Hamamoto et al. | |
| 8,264,971 | B2 * | 9/2012 | Alfano et al. | 370/242 |
| 2001/0013107 | A1 | 8/2001 | Lewis | |
| 2003/0220769 | A1 * | 11/2003 | Delegue et al. | 702/188 |
| 2004/0221296 | A1 * | 11/2004 | Ogielski et al. | 719/313 |
| 2007/0180141 | A1 * | 8/2007 | Mallesan | 709/239 |

FOREIGN PATENT DOCUMENTS

| EP | 1 734 689 | 12/2006 |
| WO | 2005086516 A1 | 9/2005 |

OTHER PUBLICATIONS

International Search Report dated Jun. 24, 2008, from corresponding PCT application.
Translation of Japanese Office Action dated Jan. 4, 2012, from corresponding JP application.

* cited by examiner

*Primary Examiner* — Donald Mills
(74) *Attorney, Agent, or Firm* — Young & Thompson

(57) ABSTRACT

A method for optimizing network performances, wherein the network includes one or more network nodes (1), performance parameters of the network nodes (1) being controlled by element of dedicated optimization modules (3), wherein each optimization module (3) monitors at least one performance parameter of the network node (1) to which the optimization module (3) is associated and generates a change request for the current value of the performance parameter on the basis of preset rules, is characterized in that the change requests generated by different optimization modules (3) of the network node (1) are forwarded to a shared controlling element (2), wherein the shared controlling element (2) enforces a coordination of the received change requests on the basis of a configurable algorithm. Furthermore, a corresponding system is disclosed.

21 Claims, 4 Drawing Sheets

METHOD AND SYSTEM FOR OPTIMIZING NETWORK PERFORMANCES

BACKGROUND OF THE INVENTION

1. Field of the Invention

The present invention relates to a method for optimizing network performances, wherein the network comprises one or more network nodes, performance parameters of said network nodes being controlled by means of dedicated optimization modules, wherein each optimization module monitors at least one performance parameter of the network node to which said optimization module is associated and generates a change request for the current value of said performance parameter on the basis of preset rules.

Furthermore, the present invention relates to a system for optimizing network performances, the system comprising dedicated optimization modules for controlling performance parameters of network nodes of the network, wherein each optimization module is configured to monitor at least one performance parameter of the network node to which said optimization module is associated and to generate change requests for the current value of said performance parameter on the basis of preset rules.

2. Description of the Related Art

The maintenance of a network involves a continuous process, where some performance data is analyzed and some configuration parameters are changed to maintain or optimize network performances. This is normally called "optimization process" of a network.

Figure 1:
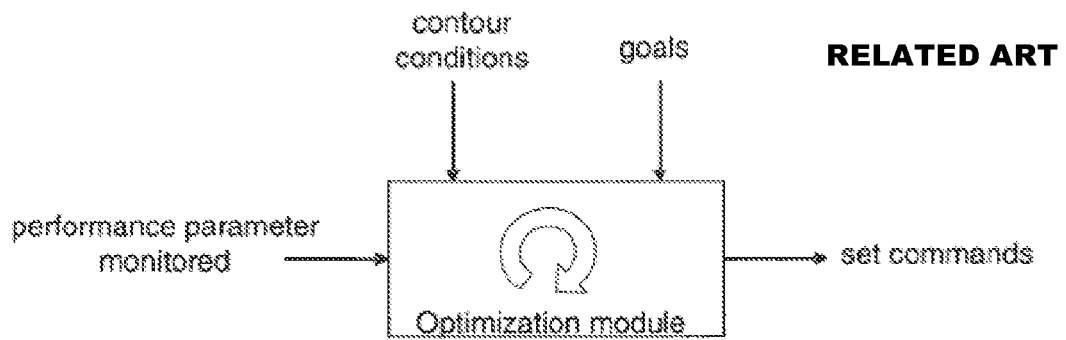

An optimization process in current networks is normally very specialized, i.e. there is a specific function module which is referred to as optimization module and which is delegated to optimize a specific performance parameter. From a black-box perspective, an optimization module reads the performance data and generates the new configuration for the network. The decision is based on goals enforced by the network administrator and by some additional constraints ("contour conditions"). Such optimization process is illustrated in FIG. 1.

As an example of a performance parameter to be monitored on a network node one can think of the average load or the average number of service requests rejected (e.g. telephone calls or network connections). In the latter case the number of service requests rejected would be continuously monitored and if the number exceeds certain thresholds (e.g. more than 10 requests rejected per hour), the optimization process would be started. In the case of a wireless network, in order to regulate the distribution of load between base stations, the power of the "pilot channel" of the base stations is normally tuned in: the higher the power, the bigger the area covered and the higher the average load received by the base station. Therefore, if a base station has too much load, with respect to predefined goal values, the optimization process would try to decrease the power of the pilot channel provided that some contour conditions are respected (e.g. a condition may require full coverage area).

Currently, in operative networks optimization processes as described above are executed on a central management station, which sends new configuration parameters to the managed network nodes. Moreover, normally the optimization process is performed manually by a person, e.g. the network administrator, who sends the configuration values. As for the example described above, it is likely that the values for the powers of the pilot channels of the base stations are configured manually, only after some alarms are reported to the administrator. For instance, in case certain preset thresholds on the load are overcome, an alarm is reported to a management station and the administrator is in charge to define a new value for the power of the pilot channel. This method, which is illustrated together with the related data flow in FIG. 2, is clearly time-consuming, error-prone and not efficient.

Figure 2:
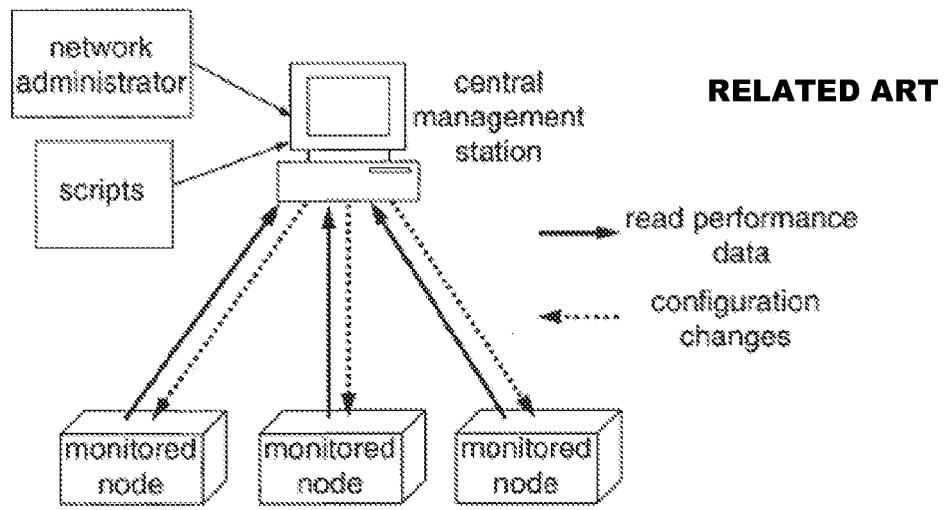

However, some degree of automation is sometimes adopted through the use of some scripts, which is also illustrated in FIG. 2. For example, a script can automatically change the value of a performance parameter of a network node, e.g. the power of the pilot channel of a base station of cellular communication network. Anyway, this is normally applied only on limited cases, because the execution of these scripts requires a proper design and dedicated computational resources. Moreover, since they are executed on a single central management station, this automated method does not scale for large networks.

Figure 3:
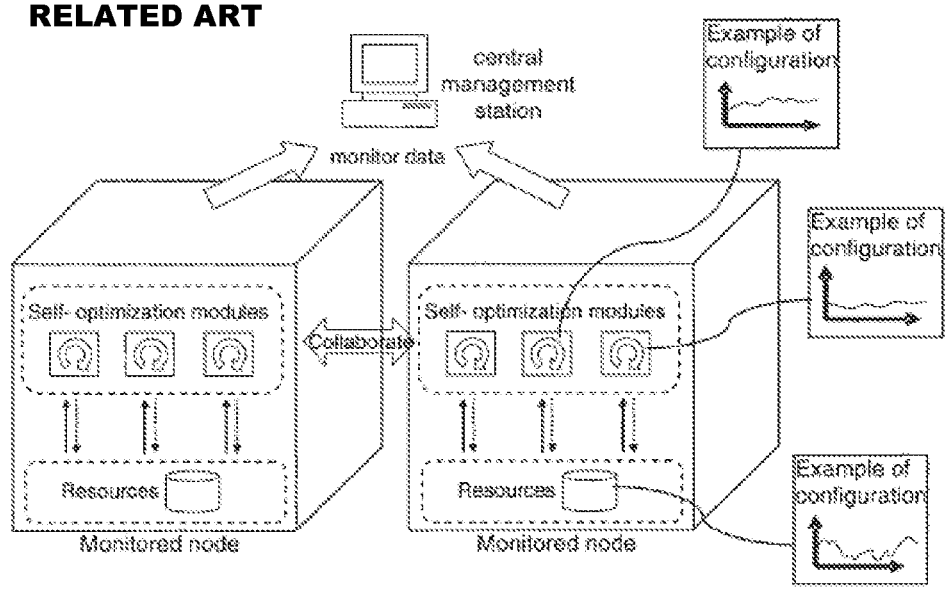

Recently emerging network architectures will try to use self-organizing principles as much as possible: the optimization processes will be automated and delegated to the managed network nodes as much as possible and different modules (e.g. programs implementing specific optimizing algorithms) will be executed locally to change many parameters. It is expected that each module will be designed for a specific function and will control a specific domain of the configuration parameters. Nodes can collaborate with each other, by exchanging information and/or commands. The advantages of such architecture are scalability, prompt intervention and reduced need of manual intervention. An example of such self-optimizing network architecture is shown in FIG. 3.

One of the problems of this approach is the coordination of the different optimization processes within the same network node and between different nodes. The problem is that the self-optimizing modules are designed and implemented independently. As a consequence, each module is not aware of the presence or the functions of the other one. The reasons for this are both technical and practical. Technically the design of a standalone optimizing algorithm and module is much easier than a combined problem. Practically each module is designed as answer to different problems and therefore the different modules are put together in the late integration stage of a product development, or even worse during the deployment of the network.

An exemplary use case for self-optimizing nodes in the evolved UTRAN is the adaptation of the cell coverage of the cells, depending on the working conditions of the neighboring cells. More in detail, if a cell is not working or is switched off for energy saving purposes (e.g. over night), its neighboring cells should increase their own coverage areas to maintain full coverage over the previous area. The coverage area is adapted by changing the power of the pilot channel of the cell. The problem is that the power of the pilot channel is also controlled by a load balancing mechanism. The concurrent access of two self-optimizing mechanisms to the same performance parameter can lead to unwanted effects, like a high frequency of changes of a parameter (e.g. power of the pilot channel changing several timers per minute) or oscillations of a parameter (e.g. a power of the pilot channel oscillating between two high and low values).

To solve these problems, it has already been proposed to implement additional logic inside each module to coordinate the interactions with other modules. The drawback of such an approach is however that it results in several points of attachment for the input of operator's policies and that it certainly requires additional complexity and adds additional costs. Moreover, this approach is not general for any additional module: when a new optimization module is introduced in the network entity and it interferes with an existing module, the existing module must be implemented again to take in account the interferences of the new module. At the end one would have "heavy modules" and eventually the costs for the required synchronization logic on each module may compensate the benefits of the automation introduced.

To summarize, the new architectures with local automated optimization processes will have the problem of concurrent configuration changes with respect to three aspects: First, concurrent change requests on the same configuration parameters coming from different modules. For example, a load balancing module and a cell outage module can concurrently change the power of the pilot channel. The problem is evident when the concurrent modules want to enforce opposite values (e.g. one modules increases and the other decreases the value). Secondly, concurrent change requests coming from different nodes, and, thirdly, repeated change requests on the same configuration parameter. For example the change requests could occur too often and some requests should be filtered. This effect is clearly more evident when different modules are involved. The side effects of these concurrent changes are unwanted configurations (i.e. bad values) or unwanted dynamics (e.g. too frequent changes) of the configuration of the node.

SUMMARY OF THE INVENTION

It is therefore an object of the present invention to improve and further develop a method and a system of the initially described type for optimizing network performances in such a way that by employing mechanisms that are readily to implement and that do not require extensive additional complexity, negative effects on network performance caused by concurrent conflicting change requests of different optimization modules of a network node are widely reduced.

In accordance with the invention, the aforementioned object is accomplished by a method where change requests generated by different optimization modules of said network node are forwarded to a shared controlling element, wherein said shared controlling element enforces a coordination of the received change requests on the basis of a configurable algorithm.

Furthermore, the aforementioned object is accomplished by a system for optimizing network performances is characterized in that the system further comprises a shared controlling element to which said change requests generated by different optimization modules of said network node are forwarded, wherein said shared controlling element is configured to enforce a coordination of the received change requests on the basis of a configurable algorithm.

According to the invention, it has first been recognized that an implementation of additional logic inside each optimization module for resolving conflicting change requests proves to be disadvantageous in various aspects. Furthermore, it has been recognized that a very efficient coordination process becomes possible by implementing an additional entity which operates separate from the single optimization modules of the network node. This additional entity is implemented as a shared controlling element to which change requests generated by different optimization modules of the network node are forwarded. Insofar, the controlling element constitutes a central entity from the viewpoint of the optimization modules. Upon receipt of change request from the optimization modules, the coordination module enforces a coordination of the concurrent change requests. The coordination process is based on a configurable algorithm which may easily be enforced by e.g. a network administrator. Furthermore, as the controlling element is shared among different optimization modules it allows for full modularization of self-optimization processes.

According to a preferred embodiment the controlling element is configured as to resolve conflicts of change requests received concurrently from different optimization modules of a network node. To this end, optimization goals may be provided, e.g. by the network administrator, that define a trade-off between different optimization modules. Such optimization goals may be passed to the controlling element and may be taken into account in the coordination process.

More specifically, according to the specific algorithm employed in the context of the coordination process, the controlling element may generate the average of change requests received from the optimization modules. In a preferred embodiment, a weighted average is calculated. By associating different weights to each optimization module, cross-module goals, i.e. conflicting goals between the single optimization modules, can be taken into account. For example, concurrent change requests for the performance parameter the power of a pilot channel (e.g. of a base station) may be coordinated by giving a high weight to an optimization module which is in charge of an error control and giving a low weight to the optimization module which is in charge of load balancing issues and averaging the values given by the optimization modules with these weights.

Alternatively or additionally, cost functions for the performance parameter under control may be passed to the controlling element and may be considered in the coordination process. The term "cost function" is to be understood in a broad sense and gives an evaluation of the negative impacts on the network performance caused by the setting of a performance parameter in the resources of a network node. Such negative aspects may include, but are not limited to, service interruptions and/or consumption of CPU power. By taking into account such cost functions in the context of the coordination process the case may arise that a decision is made not to change a performance parameter (although this might be reasonable when exclusively considering optimization goals) as the negative impacts of such performance parameter change may overcompensate the benefits resulting from a change of the performance parameter.

In a still further preferred embodiment the controlling element may be configured as to function as a filter, i.e. change requests received from one or more of the optimization modules may be blocked by the controlling element. Advantageously, the blocking may be carried out selectively for single optimization modules which may be specified by a network administrator. For instance, in case the network operator defines policies according to which the avoidance of rejections of service requests is granted highest priority, only change requests of the optimization module responsible for monitoring such service request rejections may be taken into account by the coordination module, whereas change requests from all other optimization modules of the respective network node may be blocked. Furthermore, the controlling element may be configured as to selectively overwrite the values requested by the optimization modules.

It is to be understood that the blocking functionality may be combined with the generation of (weighted) averages of change requests of the optimization modules. For example, it may be provided that one optimization module is blocked whereas an average value is generated for the other modules. From time to time, e.g. in time intervals of configurable length, the current change request of the blocked optimization module may be considered for the average generation. By this means it can be ensured that the value of the performance parameter under control does not run out of range as regards the optimization issues for which the blocked optimization module is responsible.

After having performed the coordination of the change requests received from the optimization modules of the network node under control, it may be provided that the controlling element outputs a new configuration value for the performance parameter under control. Advantageously, the controlling element may be located, as regards the interaction flow, between the optimization modules and the access to the resources of the controlled network node. The term "resources" refers to the complete set of performance parameters of the network node. The output of the controlling element may then be used for performing an update of the value of the controlled performance parameter in the resources of the network node.

It is to be noted that the functionality of the coordination module is not limited to the creation of new values for certain performance parameters. In addition, it may be provided that the coordination module can alter also the timing in which changes are enforced in the network node's resources. For example, changes may be delayed in time in order to avoid too frequent changes of a performance parameter. This is an important application when the reconfiguration of a component takes a certain time, i.e. a few seconds or even a few minutes. In such a case, it is fundamental to limit the frequency of reconfigurations.

As concerns the interaction flow it may be provided that tuples are employed, the tuples containing the performance parameter on the one hand and the configuration value of said performance parameter on the other hand. Insofar, a very simple and easy to handle interaction flow is realised. Regarding an easy handling of change requests it may be provided that each change request is associated to the requesting entity. In particular, the association of a change request to the respective requesting entity may be performed by means of the name of the requesting entity. Furthermore, the employment of an identifier associated to the requesting entity is possible.

Advantageously, a unique point of control of the coordination process performed by the controlling element is provided. More specifically, the coordination module may provide a specific input interface which allows e.g. a network administrator to configure the algorithm which is employed by the coordination module for the coordination of received change requests.

It is to be noted that any performance parameter of a network node may be optimized as described above. In particular it is to be pointed out that more than one performance parameter per network node may be optimized. In such case a separate coordination element may be provided for each performance parameter to be optimized. Collaboration between the single coordination modules of a network node is possible. We name just exemplarily the power of the pilot channel of a base station, the bandwidth of guard channels in the context of handovers and the received signal threshold for network induced handovers as performance parameters which may be controlled and optimized.

There are several ways how to design and further develop the teaching of the present invention in an advantageous way. To this end, it is to be referred to the following explanation of a preferred embodiment of the invention by way of example, illustrated by the figures. In connection with the explanation of the preferred embodiment of the invention by the aid of the figures, generally preferred embodiments and further developments of the teaching will we explained.

BRIEF DESCRIPTION OF THE DRAWING FIGURES

Figure 4:
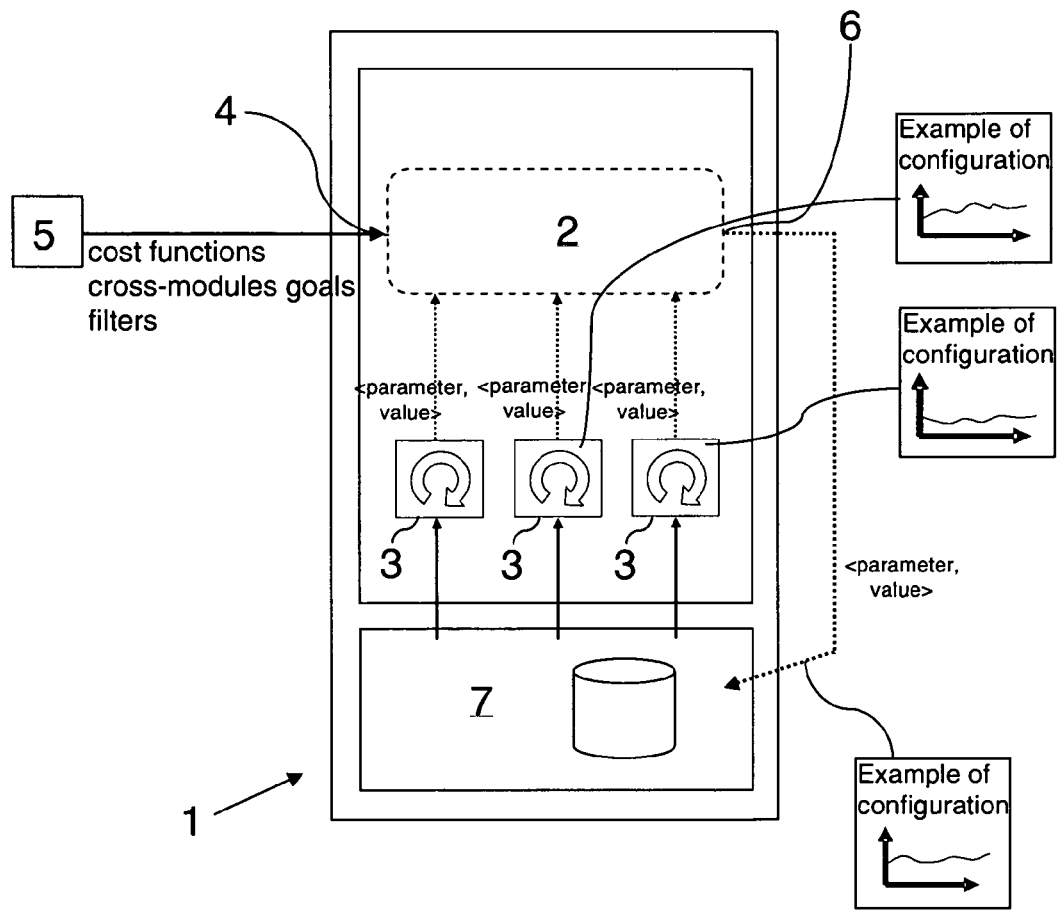
Figure 5:
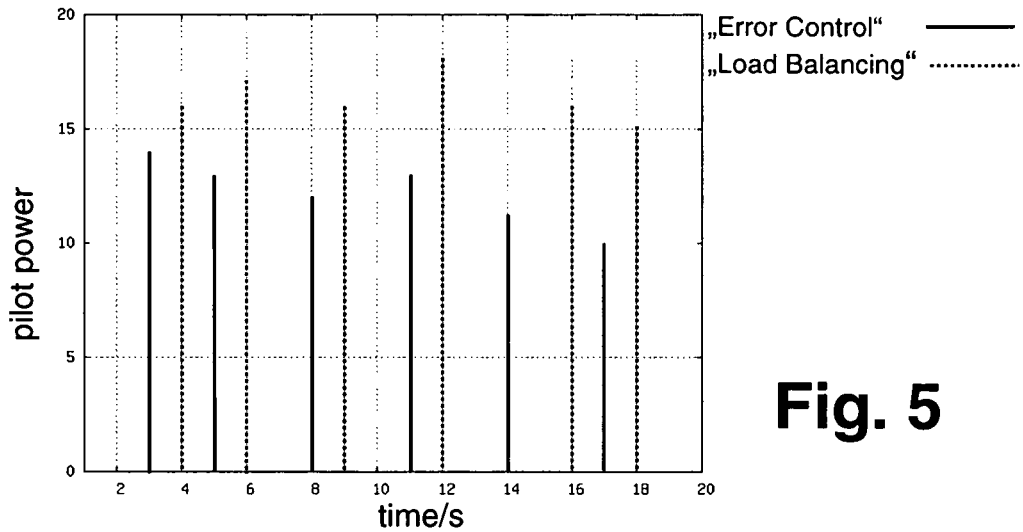
Figure 6:
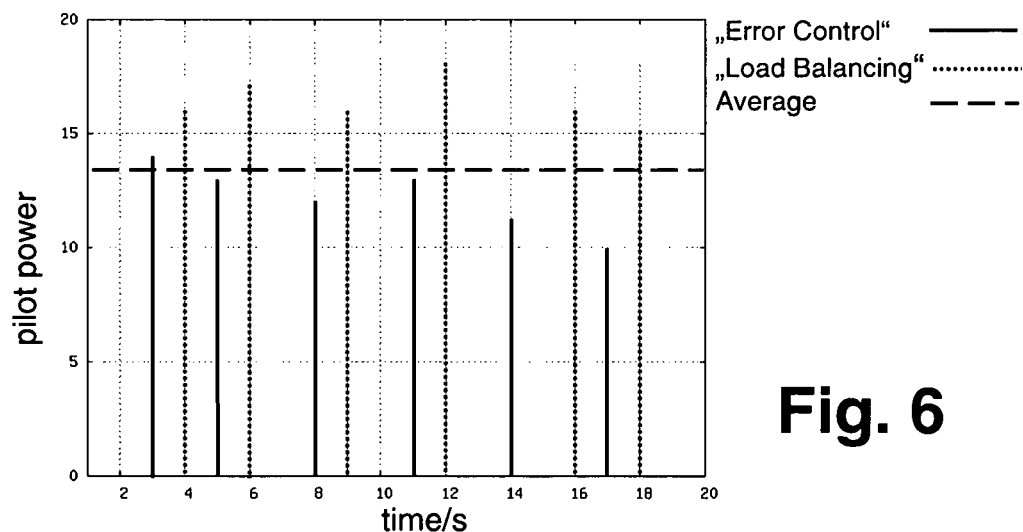

In the drawings:

FIG. 1 is a schematic illustration of the information flow in an optimization process performed by means of an optimization module according to the state of the art, FIG. 2 is a schematic illustration of an optimization process according to the state of the art which is carried out as a central process either manually or script-aided, FIG. 3 shows an optimization process according to the state of the art in a self-optimizing network, FIG. 4 shows schematically an embodiment of a system of optimizing network performances according to the invention, FIG. 5 is a diagram showing an example of concurrent change requests form two different optimization modules for a specific performance parameter without employing the method according to the invention, and FIG. 6 is a diagram showing an example of concurrent change requests form two different optimization modules for a specific performance parameter under employment of an embodiment of the method according to the invention.

DETAILED DESCRIPTION OF THE INVENTION

FIG. 1 is a schematic illustration showing the principles of an optimization process of a network as it is performed in prior art. An optimization module is provided which continuously monitors a specific performance parameter, e.g. a number of rejected services or the power of the pilot channel of a base station. In the optimization process the optimization module takes into account so called "contour conditions" which include certain constraints. Such contour condition might require, for instance, full coverage area. Furthermore, the optimization process is based on goals which are enforced e.g. by the network administrator. The optimization module outputs a new configuration value for the performance parameter under control which, in general, is output in form of a change request.

FIG. 2 illustrates the architecture employed in operative networks for performing optimization processes as described in connection with FIG. 1. The optimization modules are implemented on a central management station which reads performance data from the network nodes to be monitored. This is indicated by the solid line arrows. Nowadays it is very common that change requests are generated manually by the network administrator on the basis of the monitored results. It is also known in prior art to introduce some automation by employing scripts which can automatically change the values of specific performance parameters. Configuration changes resulting from the optimization process are transmitted from the central management station to the single nodes, which are indicated by the dotted line arrows.

FIG. 3 illustrates the situation for self-optimizing networks. In this network architecture the optimization process is widely automated and delegated to the managed network nodes. As can be obtained from FIG. 3, different optimization modules (e.g. scripts) are executed locally on the monitored network nodes (from which two are shown exemplarily) to change a multitude of performance parameters. Each optimization module is designed for a specific function and controls a specific domain of the configuration parameters.

According to the example illustrated in FIG. 3 the network node on the right part is a base station, and the three self optimization modules associated to that base station are responsible for controlling the power of the pilot channel of the base station. The small diagrams titled "example of configurations" show the change requests of the single optimization modules. Specifically, the power of the pilot channel as a function of time is depicted. The change requests of different modules are forwarded to the resources of the monitored network node which is again indicated by the dotted line arrows. According to the state of the art the change requests of different modules are treated individually. As a consequence, the power of the pilot channel suffers frequent changes, which is illustrated by the small diagram "example of configurations" associated to the resources. In this diagram the power of the pilot channel experiences strong oscillations over time.

FIG. 4 illustrates an embodiment of a system according to the present invention. For the sake clarity only one single network node 1 is shown. According to the invention a coordination module 2 is provided to which change requests generated by the optimization modules 3 of the network node 1 are forwarded. The coordination module 2 comprises a specific input interface 4 which allows for the configuration of the algorithm according to which the coordination module 2 handles the received change requests. Insofar, e.g. the network operator 5 is given a unique point of control of the coordination process. Via the input interface 4 it is possible to define cost functions, to specify cross-modules goals and/or to enter filters in order to block certain change requests.

As already mentioned above, the coordination module 2 receives the change request form the different optimization modules 3 and handles them according to the specified algorithm. For instance, the coordination module 2 might resolve conflicts of concurrent change requests or enforce cross-module optimization goals. As a result of the optimization process the coordination module 2 outputs a new configuration value for the performance parameter under control. The new configuration value is provided via a specific output interface 6 of the coordination module.

In the interaction flow, the coordination module 2 is located between the optimization modules 3 and the access to the controlled resources 7 of the managed network node 1. The new configuration value of the performance parameter is forwarded to the resources 7 as indicated by the dotted line arrow and the respective change will be executed.

Although in FIG. 4 the optimization modules 3 as well as the coordination module 2 are depicted as being implemented locally, i.e. in the managed network node 1, it is to be noted that these modules may also be implemented in a central management station. In this case, optimization algorithms would normally not be applied on local resources, but on remote resources located on the network node being monitored.

For the optimization modules 2 in the middle and on the right part, again, the diagrams titled "example of configurations" are depicted. Again, the power of the pilot channel is shown as a function of time. The functions are the same as the ones shown in FIG. 3. However, the resulting function, i.e. after performance of the coordination process, is much smoother than the resulting function of FIG. 3. As a consequence, less changes of the performance parameter have to be executed which results in an optimized network performance as, in practice, the execution of changes in the resources 7 of the network node 1 are always accompanied by service interruptions or any other disadvantageous effects.

This aspect is further clarified by the diagrams shown in FIGS. 5 and 6. These diagrams illustrate change requests for the power of the pilot channel over a time period of 20 seconds. The power on the ordinate is given in arbitrary units, e.g. in dBm or in watt. The solid bars represent change requests generated by the optimization module which is responsible for the error control. On the other hand, the dotted bars represent change requests generated by an optimization module which is responsible for load balancing issues.

FIG. 5 shows the situation without applying the present invention. Each change request generated by one of the two optimization modules is forwarded to the resources of the managed network node and respective changes of the performance parameter are executed.

FIG. 6 on the other hand shows the situation when applying the invention, i.e. a coordination module is provided to which the change request of the two optimization modules are forwarded and which handles concurrent change requests according to a specified algorithm. According to the embodiment shown in FIG. 6, a simple weighted average is used to generate a new serious of values for the performance parameter under control. Specially, different weights are associated the each optimization module according to their goals. In this example a coordination of the concurrent change requests for the power of the pilot channel is achieved by giving a high weight to the "error control" module and a low weight to the "load balancing" module. These values are averaged. FIG. 6 shows the average value taken over all change requests within the illustrated 20 second time interval. As it can be seen, the output average value is closer to the value created by the "error control" module, because it has a higher weight.

FIG. 6 does not show the delay which is necessarily introduced by the average window. However, this is an important point, as the effect of the coordination module is not limited to the creation of new values. In fact, the coordination module can alter also the timing in which changes are enforced. For example, changes may be delayed in time in order to avoid too frequent changes of a performance parameter. This is an important application when the reconfiguration of a component takes a certain time, i.e. a few seconds or even a few minutes. In such a case, it is fundamental to limit the frequency of reconfigurations.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for optimizing network performances, comprising:
    providing a network which comprises one or more network nodes, each one of the network nodes including dedicated optimization modules and a controlling element, the controlling element being shared by the dedicated optimization modules at the network node, the dedicated optimization modules and the controlling element each being located locally at the network node, performance parameters of said network nodes being controlled by the dedicated optimization modules;
    monitoring with each optimization module at least one performance parameter of the network node to which said optimization module is associated and generating a change request for the current value of said performance parameter on the basis of preset rules; and forwarding said change requests generated by different optimization modules of said network node to the controlling element at the network node to which the optimization modules are associated, the controlling element shared by the optimization modules enforcing a coordination of the received change requests on the basis of a configurable algorithm, wherein said controlling element resolves conflicts of change requests received concurrently from different optimization modules of the network node.

2. The method according to claim 1, wherein optimization goals that define a trade-off between different optimization modules are passed to said controlling element and are taken into account in a coordination process.

3. The method according to claim 1, wherein said controlling element, according to the configurable algorithm, generates an average of the change requests received from the optimization modules.

4. The method according to claim 3, wherein said algorithm includes a routine for performing a weighting of the change requests, wherein the average is generated on a basis of the weighted change requests.

5. The method according to claim 1, wherein cost functions for the performance parameter under control are passed to said controlling element and are considered in a coordination process.

6. The method according to claim 1, wherein change requests received from one or more of said optimization modules are selectively blocked by said controlling element.

7. The method according to claim 1, wherein said controlling element outputs a new configuration value for the performance parameter under control.

8. The method according to claim 1, wherein said controlling element is located between the optimization modules and the access to the resources of the controlled network node.

9. The method according to claim 1, wherein the output of said controlling element is used for performing an update of the value of the controlled performance parameter in the resources of said network node.

10. The method according to claim 1, wherein said controlling element alters a timing in which changes of a performance parameter are enforced.

11. The method according to claim 1, wherein an interaction flow between involved entities is performed by using tuples containing the performance parameter and the configuration value of said performance parameter.

12. The method according to claim 1, wherein each change request is associated to the requesting optimization module.

13. The method according to claim 12, wherein the association of a change request to a respective requesting entity is performed by the name of the requesting optimization module and/or by means of an identifier associated to the requesting optimization module.

14. The method according to claim 1, wherein the performance parameters being controlled include the power of the pilot channel of base stations, the bandwidth of guard channels in the context of handovers and/or a received signal threshold for network induced handovers.

15. A system for optimizing network performances, the system comprising:
one or more network nodes each comprising
dedicated optimization modules configured for controlling performance parameters of the network node, each optimization module being configured to monitor at least one performance parameter of the network node to which said optimization module is associated and to generate change requests for the current value of said performance parameter on the basis of preset rules; and
a controlling element shared by the dedicated optimization modules at the network node to which said change requests generated by different optimization modules of said network node are forwarded, the controlling element being configured to enforce a coordination of the received change requests on the basis of a configurable algorithm,
wherein the dedicated optimization modules and the controlling element are each locally located at the network node, and
the system is configured to optimize network performance according to the following steps:
providing the network which comprises the one or more network nodes, each one of the network nodes including the dedicated optimization modules and the controlling element, the performance parameters of said network nodes being controlled by the dedicated optimization modules;
monitoring with each optimization module the at least one performance parameter of the network node to which said optimization module is associated and generating the change request for the current value of said performance parameter on the basis of the preset rules; and
forwarding said change requests generated by different optimization modules of said network node to the controlling element at the network node to which the optimization modules are associated, the controlling element shared by the optimization modules enforcing the coordination of the received change requests on the basis of the configurable algorithm, and
wherein said controlling element is configured to resolve conflicts of change requests received concurrently from different optimization modules of the network node.

16. The system according to claim 15, wherein said controlling element is configured as to receive cost functions for the performance parameter under control which are considered in the coordination process.

17. The system according to claim 15, wherein said controlling element is enabled to selectively block change requests received from one or more of said optimization modules.

18. The system according to claim 15, wherein said controlling element is enabled to overwrite configuration values received from said optimization modules in the context of change requests.

19. The system according to claim 15, wherein said controlling element outputs a new configuration value for the performance parameter under control.

20. The system according to claim 15, wherein said controlling element is located between the optimization modules and an access to the resources of the controlled network node.

21. The system according to claim 15, wherein a unique point of control of a coordination process performed by said controlling element is provided.

* * * * *